United States Patent [19]

Inoue et al.

[11] Patent Number: 5,550,799
[45] Date of Patent: Aug. 27, 1996

[54] DEVICE FOR AND METHOD OF CALIBRATING OPTIMUM RECORDING POWER FOR RECORDABLE OPTICAL DISC RECORDING APPARATUS

[75] Inventors: Akiyoshi Inoue; Shoji Taniguchi; Eisaku Kawano; Naoharu Yanagawa; Hiroshi Suzuki, all of Saitama-ken, Japan

[73] Assignee: Pioneer Electronic Corporation, Tokyo-to, Japan

[21] Appl. No.: 374,872

[22] Filed: Jan. 19, 1995

[30] Foreign Application Priority Data

Jan. 26, 1994 [JP] Japan ................... P06-6943

[51] Int. Cl.⁶ ............................................. G11B 7/00
[52] U.S. Cl. ........................... 369/116; 369/58/54
[58] Field of Search ......................... 369/120, 116, 369/115, 119, 275.1, 275.4, 54, 58; 360/40, 48, 22, 32

[56] References Cited

U.S. PATENT DOCUMENTS

| | | | |
|---|---|---|---|
| 5,226,027 | 7/1993 | Bakx | 369/58 |
| 5,274,622 | 12/1993 | Kono | 369/116 |
| 5,289,453 | 2/1994 | Ohno et al. | 369/116 |
| 5,353,270 | 10/1994 | Iimura | 369/54 |
| 5,426,632 | 6/1995 | Murakami et al. | 369/275.4 |

*Primary Examiner*—Loha Ben
*Attorney, Agent, or Firm*—Kane, Dalsimer, Sullivan, Kurucz, Levy, Eisele and Richard, LLP

[57] ABSTRACT

A laser power calibration device installed in a recording device for recording information on an optical recording medium includes: laser unit for emitting and irradiating a laser beam on the optical recording medium to record FM video signal and EFM audio signal; unit for varying recording power of the laser beam and duty of recording signal for driving the laser unit independently of each other; unit for reading the FM video signal and EFM audio signal recorded on the optical recording medium; unit for detecting carrier level of the recorded FM video signal and error rate of recorded EFM audio signal; and unit for determining optimum recording power of the laser beam so that the carrier level is higher than a first predetermined value and the error rate is smaller than a second predetermined value.

8 Claims, 13 Drawing Sheets

| | RECORDING AREA |
|---|---|
| RADIUS FROM DISC CENTER [mm] | 51.5 ~ 145 |

| | REFERENCE AREA | RECORDING AREA |
|---|---|---|
| RADIUS FROM DISC CENTER [mm] | 51.5~55 | 55~145 |

RECORDING SIGNAL

PIT FORMED

RECORDING SIGNAL

PIT FORMED

DEVICE FOR AND METHOD OF CALIBRATING OPTIMUM RECORDING POWER FOR RECORDABLE OPTICAL DISC RECORDING APPARATUS

BACKGROUND OF THE INVENTION

1. Field of the Invention

This invention relates to a recording apparatus for recordable optical disc, and more particularly to a recording apparatus for recordable optical disc in conformity with Laser Disc (LD) format.

2. Description of the Prior Art

There is known Recordable Compact Disc (CD-R) on which audio information is recordable according to recording format of Compact Disc (CD). CD-R is provided with a program area and a lead-in area on which wobbled pregroove is formed, and absolute time information (ATIP:Absolute Time In Pregroove) is multiplexed to wobbling signal for forming the wobbled pregroove. In addition, in CD-R, last recording address information is recorded in Program Memory Area (PMA), and, at the time of additional recording, recording position corresponding to the last recording address is searched for using the wobbled pregroove which includes ATIP information.

On the other hand, it has been developed Recordable Laser Disc (LD-R) on which audio and video information are recordable according to recording format of Laser Disc (LD). FIG. 1 illustrates recording format of LD-R. As illustrated, a virgin (non-recorded) LD-R is provided with only a recording area 102 on which pregroove is formed with track pitches 1.4–2.0 μm at an range of 51.5–145 [mm] measured from disc center, i.e., outer circumference of center hole 101. That is, no information relating to disc itself is recorded on LD-R. Recently, many types of optical discs have been developed, and specific characteristic of optical discs are generally different from its maker to maker. In this view, it is important to record information relating to disc itself in advance.

However, it is impossible to record information relating to disc on LD-R by forming wobbled pregroove like the manner of CD-R, because, if wobbled pregroove is formed on LD-R, wobbling frequency $f_w$ should be determined as follows:

$$f_w = 20.05[\text{kHz}] \times 11.4[\text{m/sec.}]/1.4[\text{m/sec.}] = 180[\text{kHz}].$$

This is due to difference of linear velocities of disc rotation between CD and LD (CD:1.4 m/sec., LD:11.4 m/sec.). Therefore, wobbling frequency $f_w$ interferes with EFM (Eight to Fourteen Modulation) band (196–720 kHz). An idea for overcoming this drawback is to alter wobbling frequency. However, when audio information is recorded according to LDD (Laser Disc with Digital sound) format in which information is recorded using frequency band from DC - 10 MHz, there is no blank frequency band remaining for wobbling signal.

In a case of CD-R, an optimum recording power is calibrated utilizing Power Calibration Area (PCA) formed innermost circumferential portion of virgin disc, so that an error rate of EFM signal recorded in PCA by test recording becomes substantially minimum. However, since information is recorded on LD-R in analog manner, it is advantageous to examine S/N ratio of reproduced video signal, and hence optimum recording power is determined so that S/N ratio of reproduced video signal recorded by test recording becomes substantially maximum. In this regard, measurement of S/N ratio requires an exclusive device, however, providing LD-R recorder with such a special device for S/N ratio measurement is unreasonable.

SUMMARY OF THE INVENTION

It is an object of the present invention to provide an LD-R recorder capable of easily and accurately determining optimum recording power.

According to one aspect of the present invention, there is provided a method of calibrating power of laser beam emitted from a laser unit installed in a recording device and irradiated on an optical recording medium, including the steps of: performing test recording of FM video signal and EFM audio signal with varying recording power of the laser beam and duty of recording signal for driving the laser unit independently of each other; detecting carrier level of the recorded FM video signal and error rate of recorded EFM audio signal; and determining optimum recording power of the laser beam so that the carrier level is higher than a first predetermined value and the error rate is smaller than a second predetermined value.

According to another aspect of the present invention, there is provided a laser power calibration device installed in a recording device for recording information on an optical recording medium, including: laser unit for emitting and irradiating a laser beam on the optical recording medium to record FM video signal and EFM audio signal; unit for varying recording power of the laser beam and duty of recording signal for driving the laser unit independently of each other; unit for reading the FM video signal and EFM audio signal recorded on the optical recording medium; unit for detecting carrier level of the recorded FM video signal and error rate of recorded EFM audio signal; and unit for determining optimum recording power of the laser beam so that the carrier level is higher than a first predetermined value and the error rate is smaller than a second predetermined value.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENT

Preferred embodiments of the present invention will be described below with reference to the accompanying drawings.

[1] Recordable Optical Disc

Firstly, a recordable optical disc according to the present invention will be described. Recordable optical disc according to this embodiment is characteristic in that information relating to disc is recorded on the disc itself. In these days, many disc makers produce optical discs, however, specific characteristics of discs produced by different makers are generally slightly different from each other. In this view, if disc-related information, such as optimum recording power, relationship between optimum recording power and wavelength of recording laser beam or the like, is recorded on a virgin disc in advance, an operator can readily record desired information with high accuracy.

Figure 1:
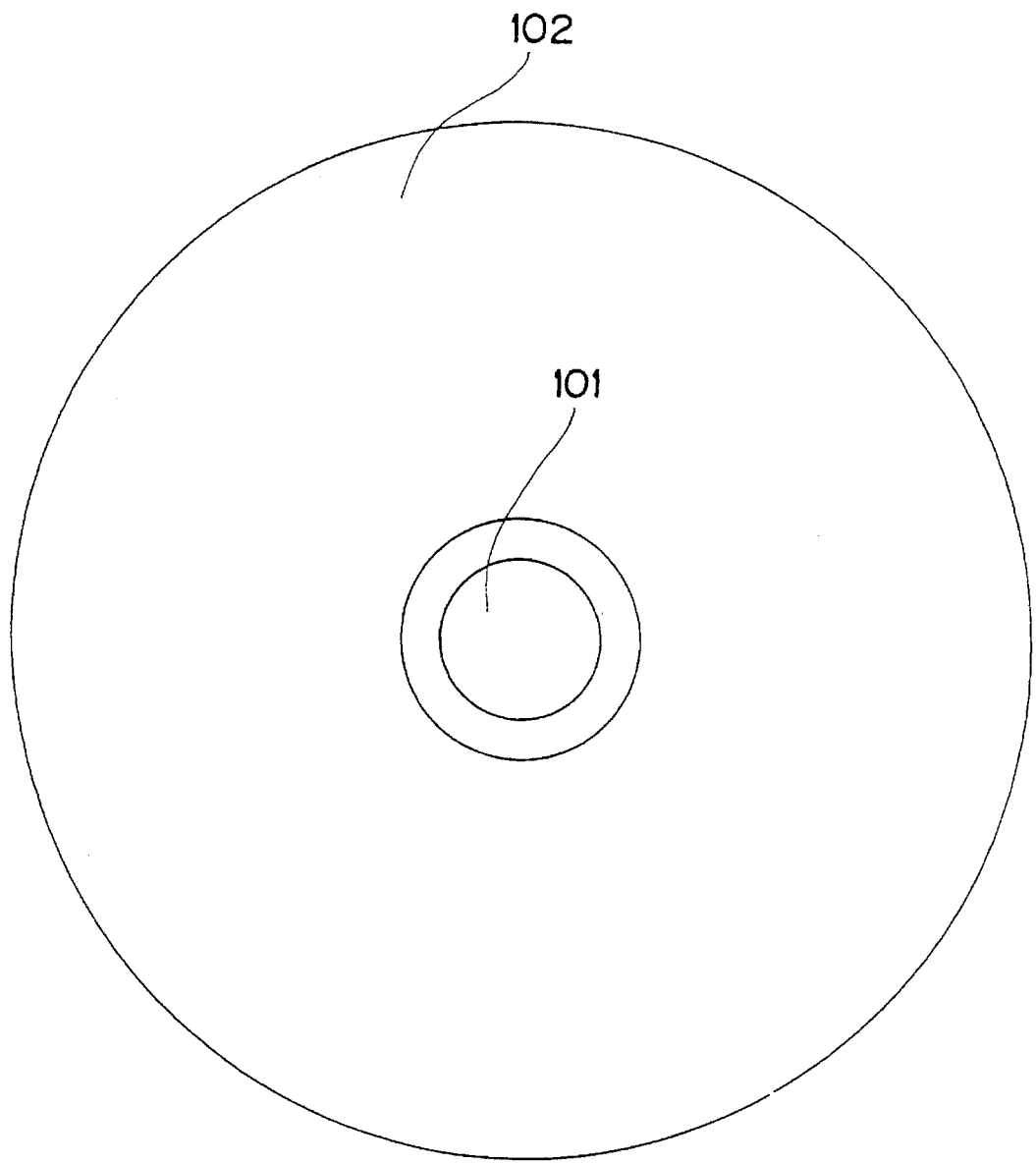
FIG. 1 is a diagram illustrating physical recording format of LD-R.
Figure 2:
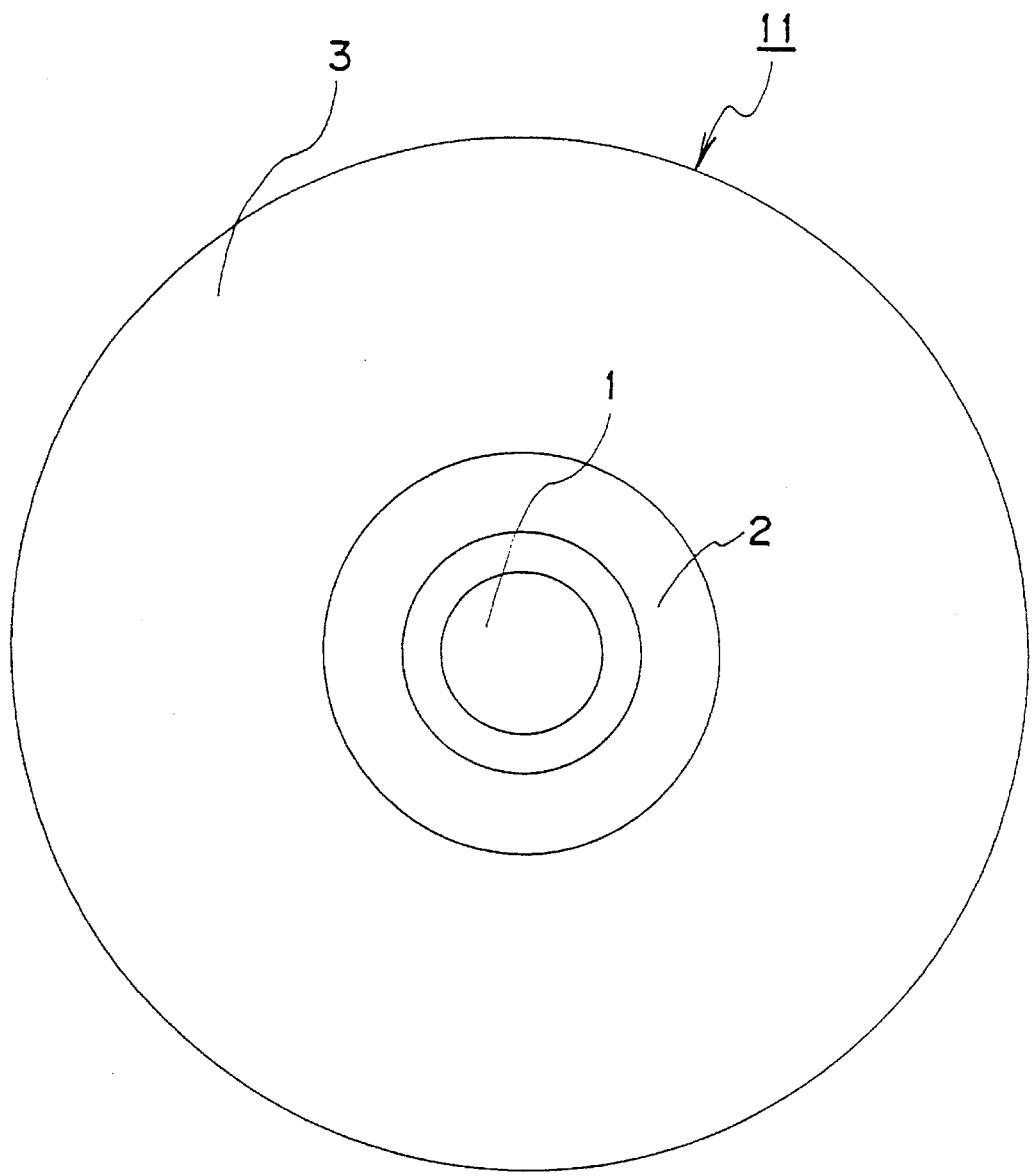
FIG. 2 is a diagram illustrating recording format of recordable optical disc.

FIG. 2 illustrates recording format of a recordable optical disc according to an embodiment of the present invention. As illustrated, an optical disc 11 is provided with a center hole 1, a reference area 2 and a recording area 3 from inner circumference of the disc 11 in this order. The reference area 2 is formed in a range of radial position 51.5–55 [mm] (hereinafter "radial position of XX [mm]" indicates a position of radius XX [mm] measured from outer circumference of the center hole 1). The recording area 3 is formed in a range of radial position of 55–145 [mm], and DC groove (non-wobbled groove) is formed thereon. The reference area 2 corresponds to PCA and PMA of CD-R and is provided with wobbled pregroove. Wobbling frequency of pregroove in the reference area 2 may be 180 [kHz]. Disc-related information is multiplexed to wobbling signal for forming the wobbled pregroove on the disc 11. Since no audio and video information is recorded in the reference area 2, wobbling frequency 180 [kHz] does not interfere with any audio and video information, and therefore disc-related information can be recorded in the reference area 2.

Disc-related information includes information for discriminating Constant Angular Velocity (CAV) disc and Constant Linear Velocity (CLV) disc, optimum recording conditions, wavelength of recording laser beam, relationship between optimum recording power and wavelength of recording laser beam, recording addresses, radial position, rotational number of spindle motor, genre of program source, content of recorded information and manner of determining optimum recording power, optimum duty ratio of recording signal and the like. As mentioned above, disc-related information can be recorded on a virgin LD-R disc, in advance, by forming wobbled pregroove in the reference area 2.

Alternatively, disc-related information may be recorded on LD-R by forming prepits in the reference area 2, alternative to forming wobbled pregroove, or by performing laser heat recording which is used for recording information on the recording area 5 whose radial position is more than 55 [mm]. Further, information relating to disc may be recorded on areas where vertical synchronizing signals are to be recorded, in place of the reference area 2 of radial position of 51.5–55 [mm].

As described above, by recording, in advance, disc-related information, recording audio and video information on LD-R can be carried out accurately and relatively readily with low cost, without providing any additional devices.

[2] LD-R Recorder

Next, an LD-R recorder for recording audio and video signals on LD-R according to LDD format will be described below.

Figure 3:
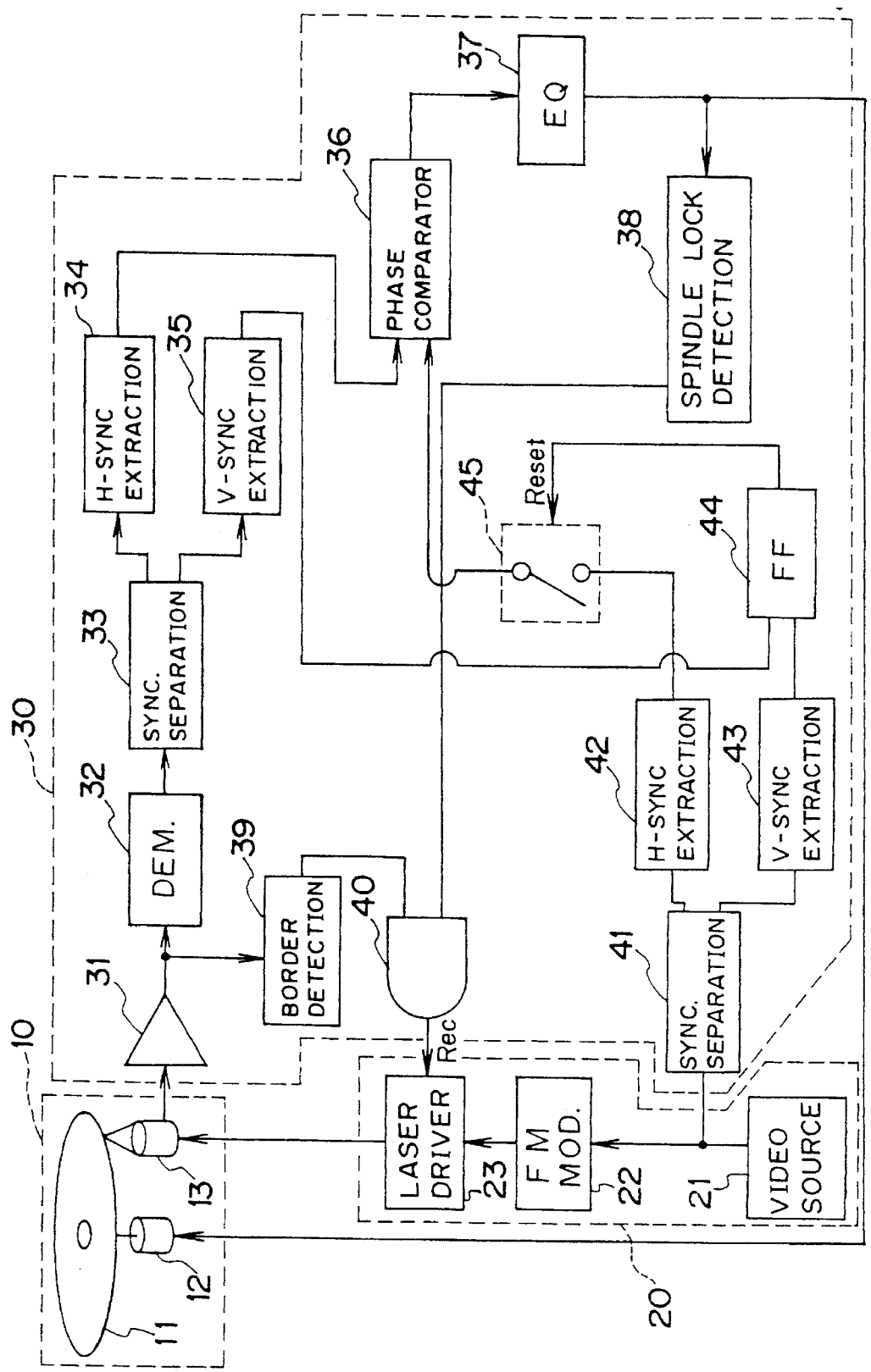
FIG. 3 is a block diagram illustrating construction of LD-R recorder according to the present invention.

FIG. 3 illustrates construction of LD-R recorder according to an embodiment of the present invention. Referring to FIG. 3, the LD-R recorder mainly includes disc reproduction system 10, recording system 20 and signal processing system 30. For the sake of simplicity, servo system and CPU are omitted from illustration. The disc reproduction system 10 includes a disc (LD-R) 11 on which signal is recorded, a spindle motor 12 for rotating the disc 11, and a pickup 13 for reading out signal from the disc 11. The recording system 20 includes a video source 21 for generating video signal to be recorded on the disc 11, an FM modulator 22 for modulating video signal supplied from the video source 21, and a laser driver 23 for controlling recording laser power according to the FM-modulated video signal supplied from the FM modulator 22. The signal processing system 30 includes an RF amplifier 31, a demodulator 32, sync-separation circuits 33 and 41, H.sync-extraction circuits 34 and 42, V.sync-extraction circuits 35 and 43, a flipflop 44, a reset switch 45, a phase comparator 36, an equalizer 37, a spindle lock detection circuit 38, a border detection circuit 39 and an AND gate 40. The RF amplifier 31 amplifies an RF signal read by the pickup 13, and the demodulator 32 carries out FM-demodulation onto the amplified RF signal. The sync-separation circuit 33 separates synchronizing signals from the video signal demodulated by the demodulator 32. The H.sync-extraction circuit 34 extracts H.sync signal and the V.sync-extraction circuit 35 extracts V.sync signal. The sync-separation circuit 41 separates synchronizing signals from the video signal supplied by the video source 21. The H.sync-extraction circuit 42 extracts H.sync signal and the V.sync-extraction circuit 43 extracts V.sync signal. The flipflop 44 receives V.sync signals from the V.sync-extraction circuits 35 and 43, and controls the reset switch 45. The phase comparator 36 compares phase of the H.sync signals from the H.sync-extraction circuit 34 with phase of the H.sync signals from the H.sync-extraction circuit 42. The equalizer 37 receives comparison result of the phase comparator 36, and the spindle lock detection circuit 38 detects locked state of the spindle motor 12 and outputs spindle lock signal. The border detection circuit 39 detects border of recorded region and unrecorded region on the disc 11 based on the RF signal and outputs a border detection signal. The AND gate 40 supplies an additional recording instruction signal, based on the spindle lock signal and the border detection signal, to the laser driver 23 to control it.

Next, an operation of recording video signal, by the LD-R recorder, on unrecorded area of the disc will be described. The FM modulator 22 modulates video signal from the video source 21 according to LDD format, and supplies it to the laser driver 23. The laser driver 23 allows the pickup 13 to start recording when receiving additional recording instruction signal from the AND gate 40.

Next, condition for starting additional recording, that is, condition under which the AND gate 40 issues additional recording instruction signal, will be described. The border detection circuit 39 detects border of recorded and unrecorded area on the disc 11 on the basis of the amplified RF signal, and then supplies border detection signal to the AND gate 40. Detailed description of border detection will be described later. The phase comparator 36 compares phase of the H.sync. signal reproduced from the disc 11 with phase of H.sync. signal of video signal output from the video source 21. Result of comparison is supplied to the spindle lock detection circuit 38 and the spindle motor 12 via the equalizer 37. Namely, rotation of the spindle motor 12 is controlled in accordance with the phase difference of the H.sync. signals. When the H.sync. signals are in phase, the spindle lock detection circuit 38 makes spindle servo loop locked state, that is, allows the spindle motor 12 to rotate at a constant velocity, and supplies lock detection signal to the AND gate 40. The AND gate 40 supplies additional recording instruction signal to the laser driver 23 when receiving border detection signal from the border detection circuit 39 and spindle lock signal from the spindle lock detection circuit 38. In other word, the AND gate 40 outputs additional recording instruction signal when the border of recorded region and unrecorded region of the disc 11 is detected and the spindle servo loop is in locked state.

Figure 4:
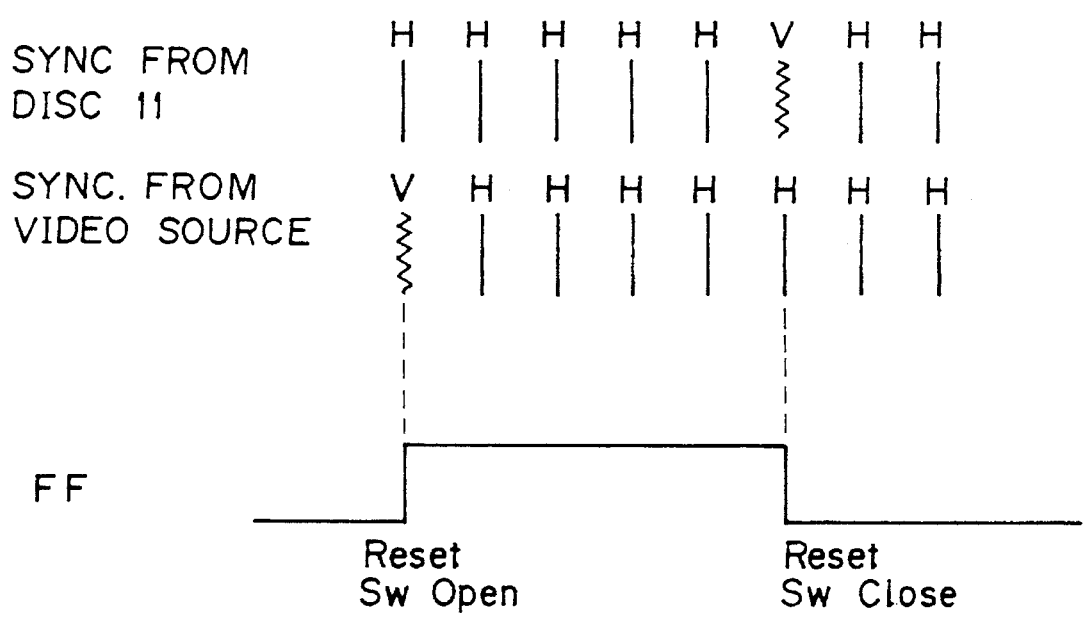
FIG. 4 schematically illustrates operation of the flipflop provided in the LD-R recorder.

FIG. 4 schematically illustrates operation of the flipflop 44 provided in the LD-R recorder. As illustrated, the flipflop 44 opens the reset switch 45 when a vertical synchronizing signal is supplied from the video source 21, and closes the reset switch 45 when a vertical synchronizing signal is supplied from the pickup 13.

Figure 5:
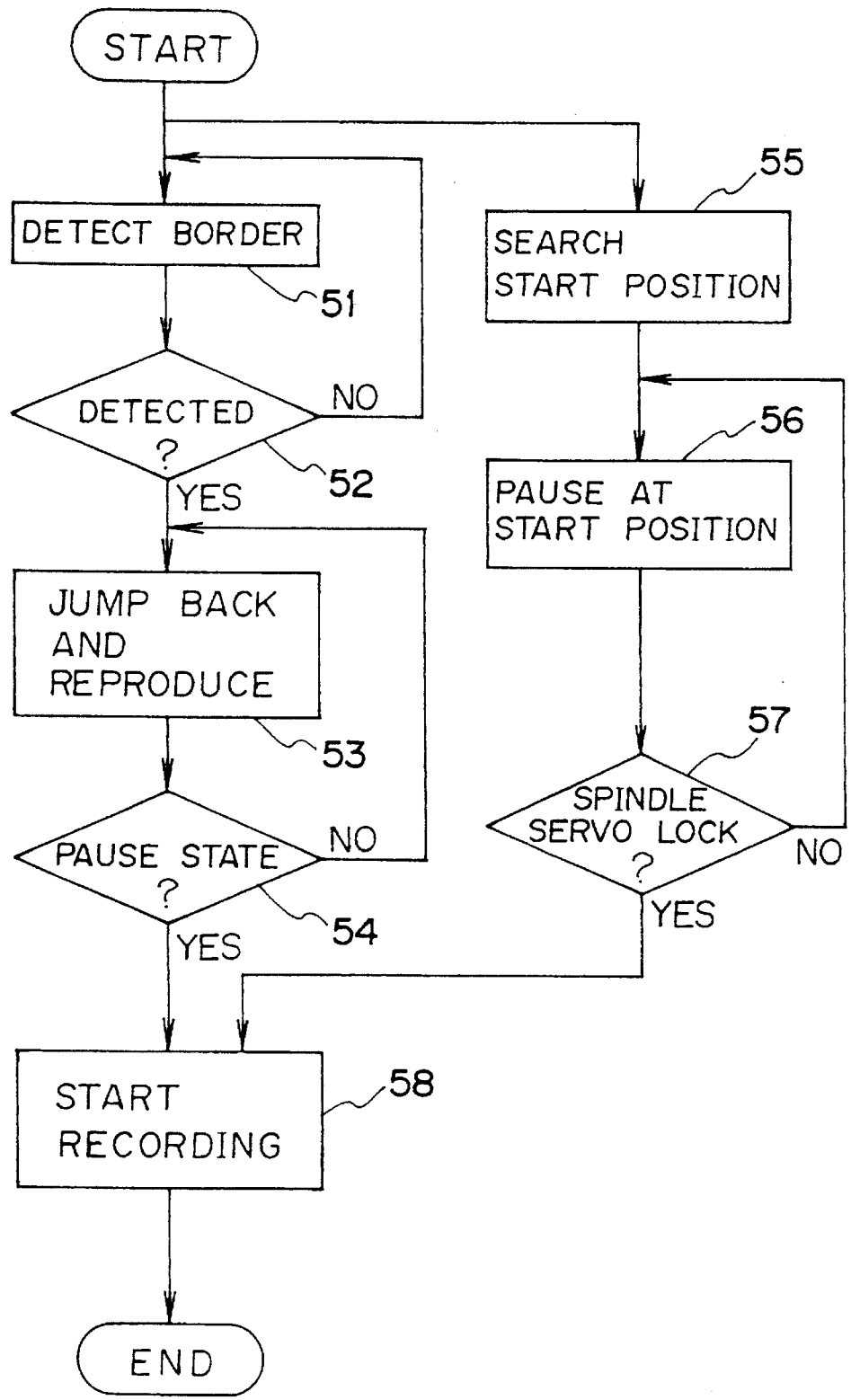
FIG. 5 is a flowchart illustrating operation of the LD-R recorder.

FIG. 5 is a flowchart illustrating operation of the LD-R recorder. As illustrated, border detecting operation (steps 51–54) and search operation for reproduction start position of video source (steps 55–57) are executed independently. Firstly, border detecting operation will be described. The border detection circuit 39 detects a border of recorded and unrecorded regions on the disc 11 by a detection operation described later (step 51), and then CPU judges whether the border is detected or not (step 52). If the border is not detected yet (step 52:No), steps 51–52 are repeated. If the border is detected (step 52:Yes), CPU instructs the pickup 13 to jump several tracks in reverse direction and to reproduce information up to the border (step 53). The number of tracks that are jumped back by the pickup 13 is so decided that, during the jump back operation, the spindle servo loop can be locked. Then, it is judged whether the pickup 13 is in pause state or not (step 54) and, if not, steps 53–54 are repeated.

Next, search operation for start position of video source will be described. Firstly, CPU issues an instruction to search for reproduction start position of video source, and the start position from where signal of video source is recorded on the disc 11 is searched for (step 55). When the start position is detected, the video source 21 is made pause state at the start position (step 56). Then, it is judged whether spindle servo loop of the video source 21 is locked or not (step 57), and, if not (step 57:No), steps 56–57 are repeated. Conclusively, when the pickup 13 is in pause state (step 54:Yes) and the spindle servo loop of the video source 21 is locked (step 57:Yes), recording of video signal from the video source 21 to the disc 11 commences (step 58).

Figure 6:
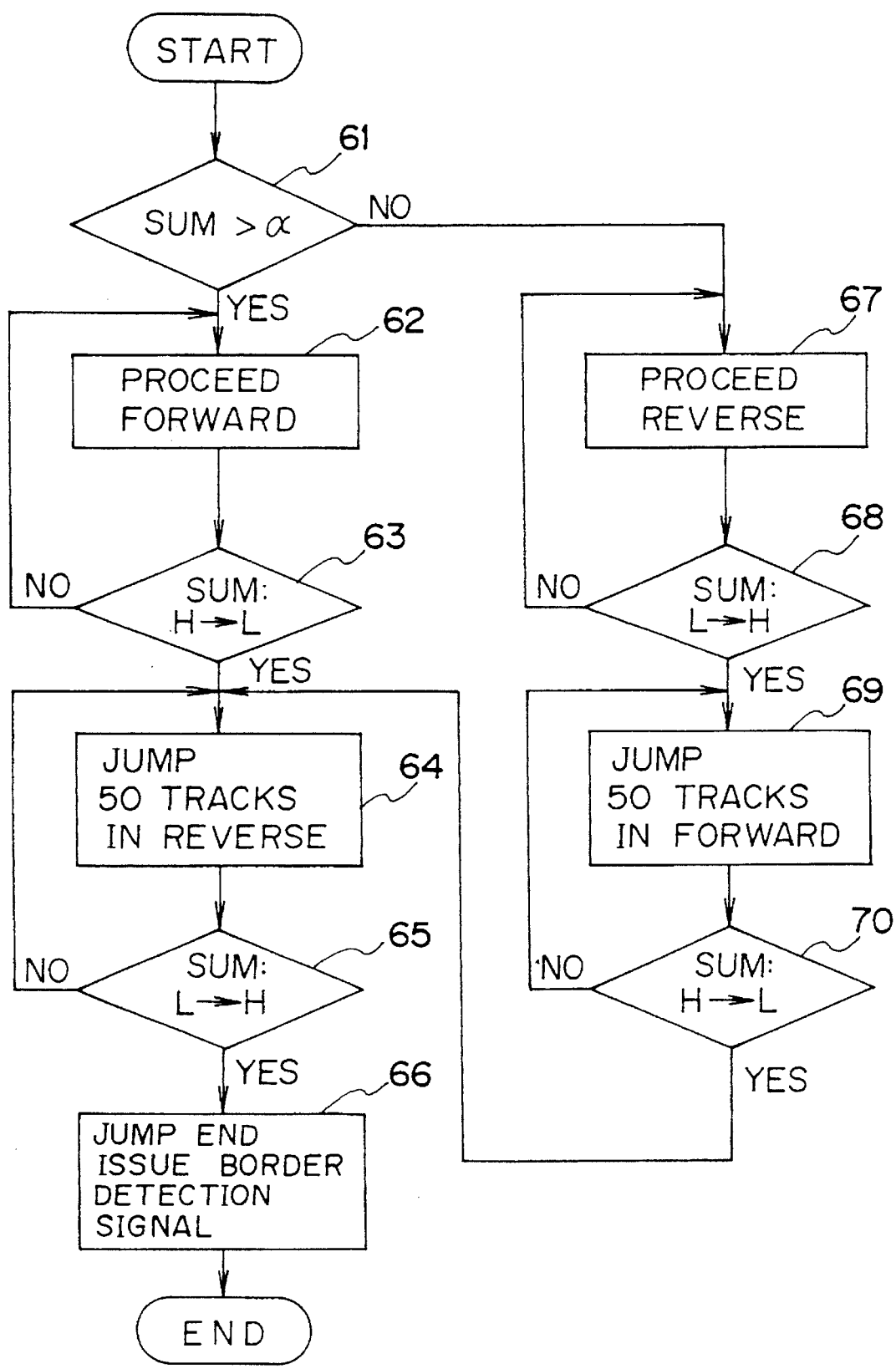
FIG. 6 is a flowchart illustrating an operation of border detection method.
Figure 10:
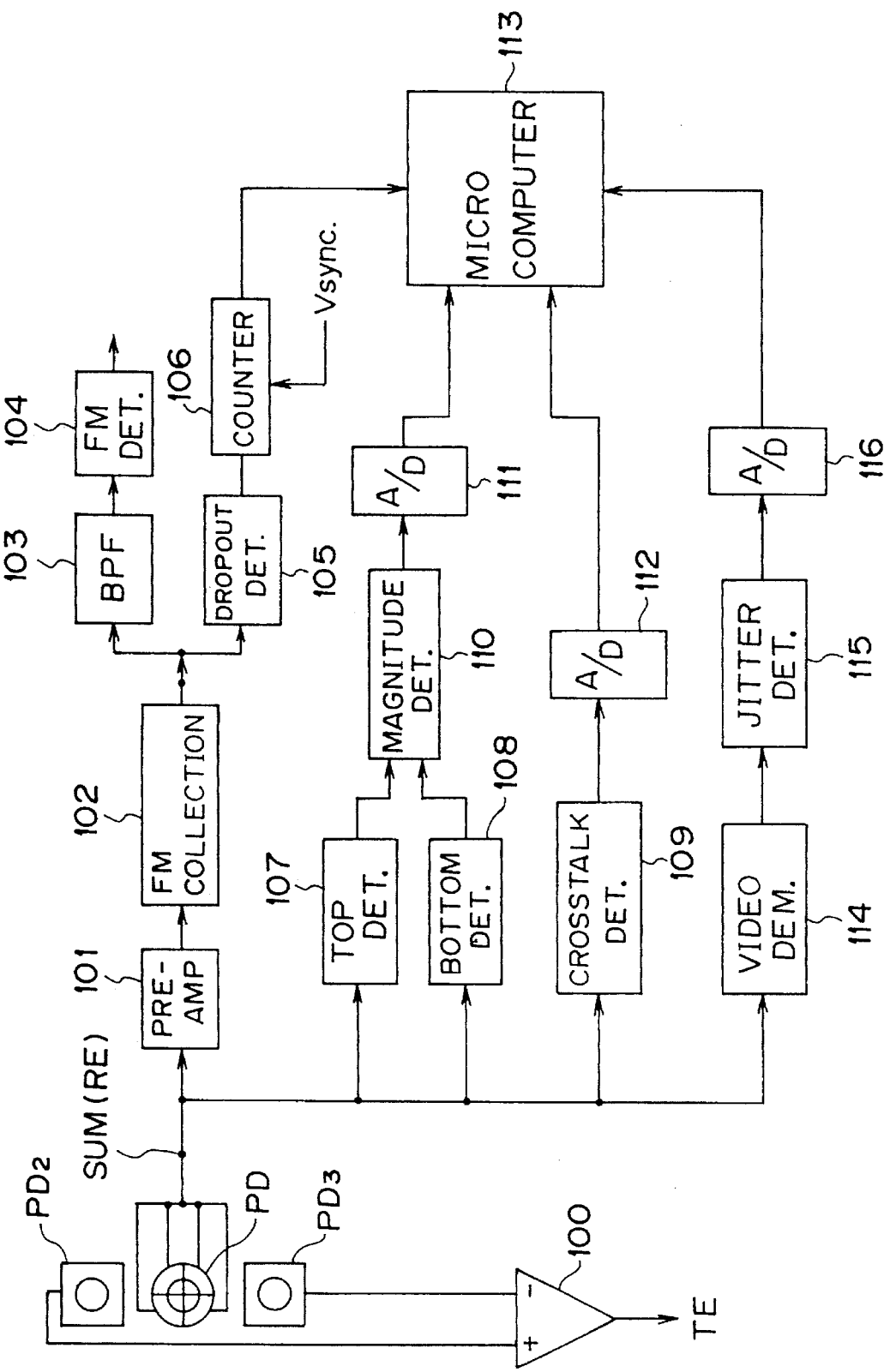
FIG. 10 illustrates a circuit for detecting evaluation factors.

Next, a method of detecting the border will be described. FIG. 6 is a flowchart illustrating an operation of border detection. In this method, border is detected utilizing difference of reflectivities between recorded and unrecorded regions of LD-R. Reflectivity of recording surface of disc is represented by magnitude of RF signal obtained by pickup. Namely, magnitude of RF signal is large in recorded region of LD-R because signal is recorded while magnitude of RF signal is small in unrecorded region because no signal is recorded and only pregrooves are formed. In this view, border of recorded and unrecorded regions is detected by monitoring variation in magnitude of RF signal. An RF signal corresponding to recorded information is obtained, for example, as a sum of output signals of 4-divided photodetector which is generally used for focus servo control. In this embodiment, sum of output signals of 4-divided photodetector (hereinafter referred to as "focus sum signal SUM") is used as an RF signal of recorded information (see. FIG. 10). In the following description, "forward" direction means direction to which pickup proceeds in normal reproduction, and "reverse" direction means direction opposite to the forward direction. Firstly, it is judged whether present magnitude of focus sum signal SUM is larger than a predetermined magnitude a or not (step 61), and, if Yes, tracking servo loop is opened and the pickup 13 is driven in forward direction (step 62). When the pickup 13 proceeds a certain distance in forward direction, it is judged whether the magnitude of the focus sum signal SUM decreases or not (step 63). Until the magnitude of the focus sum signal SUM becomes smaller than the predetermined magnitude $\alpha$, steps 62 and 63 are repeated. On the other hand, if the magnitude of the focus sum signal SUM is smaller than the predetermined magnitude $\alpha$ in step 61, tracking servo loop is opened and the pickup 13 is driven in reverse direction (step 67). When the pickup 13 proceeds a certain distance in reverse direction, it is judged whether the magnitude of the focus sum signal SUM increases or not (step 68). Until the magnitude of the focus sum signal SUM becomes larger than the predetermined magnitude $\alpha$, steps 67 and 68 are repeated. If step 68 results in Yes, the pickup 13 jumps 50 tracks in forward direction (step 69), and then it is judged whether the magnitude of the focus sum signal SUM decreases or not (step 70). Until the magnitude of the focus sum signal SUM becomes smaller than the predetermined magnitude $\alpha$, steps 69 and 70 are repeated. If step 63 or step 70 results in Yes, the pickup 13 jumps 50 tracks in reverse direction (step 64), and then it is judged whether the magnitude of the focus sum signal SUM increases or not (step 65). If Yes, jumping operation of the pickup 13 is terminated and border detection signal is issued (step 66). Alternatively, if step 65 results in No, steps 64 and 65 are repeated until the magnitude of the focus sum signal SUM becomes larger than the predetermined magnitude $\alpha$.

Figure 7:
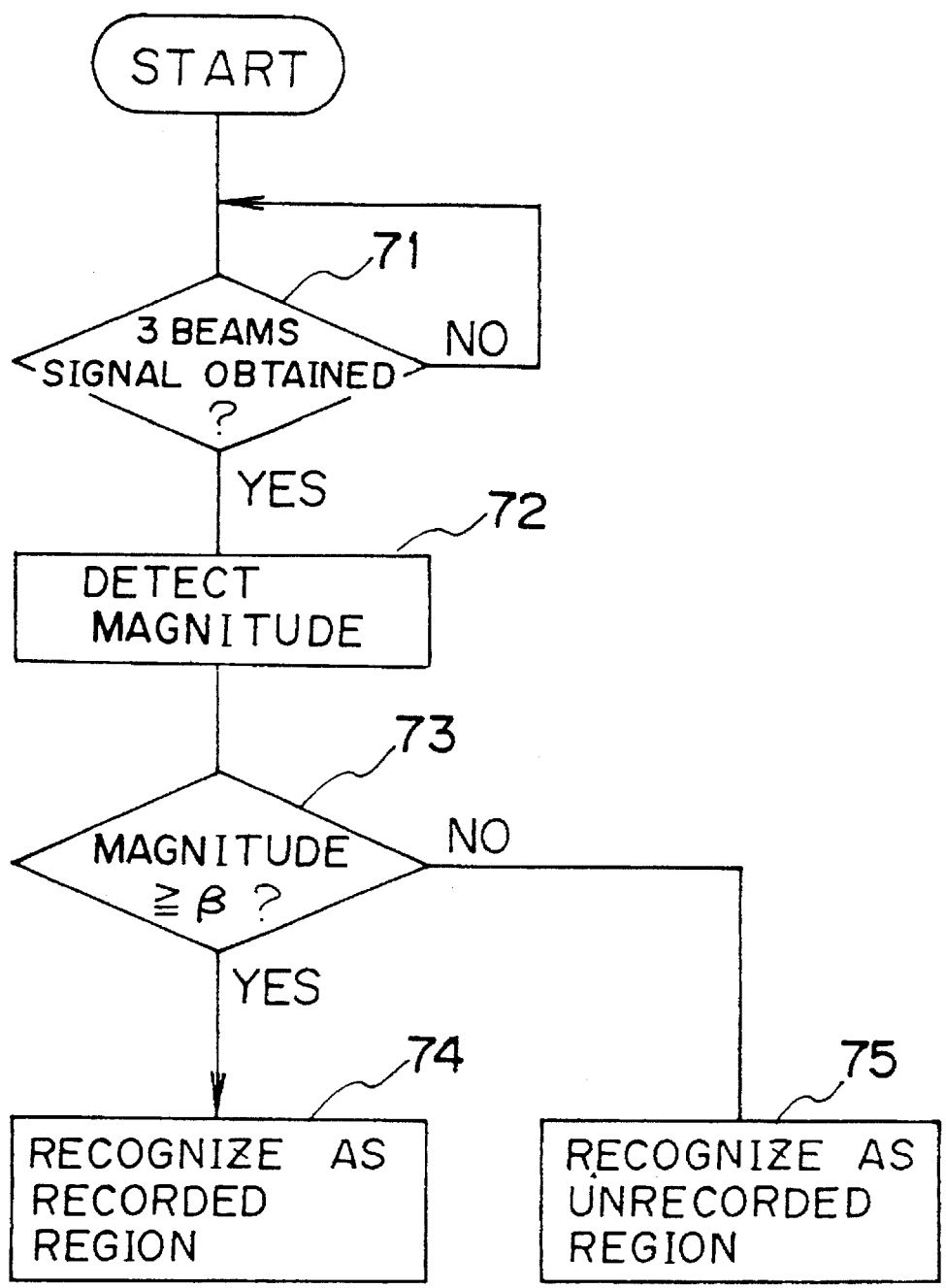
FIG. 7 is a flowchart illustrating operation of another border detection method.

Next, another method of detecting border will be described. FIG. 7 is a flowchart illustrating operation of another border detection method. In this method, border is detected utilizing presence and absence of three-beams signal between recorded and unrecorded areas of LD-R. Three-beams signal is a tracking error signal obtained by three-beam tracking control method (hereinafter referred to as "three-beams signal TE", see. FIG. 10). Namely, three-beams signal TE can be obtained (i.e., not zero) in recorded region of LD-R where information pits are formed while three-beams signal TE cannot be obtained (i.e., zero) in unrecorded region where no information pits are formed and only pregrooves are formed. This is because, when no information pits are formed, output signal of photo-detectors $PD_2$ and $PD_3$ are both zero (see. FIG. 10). In this view, border of recorded and unrecorded regions can be detected by monitoring three-beams signal TE. In FIG. 7, firstly it is judged whether three-beams signal TE is obtained or not (step 71), and, if Yes, magnitude of the three-beams signal TE is detected (step 72). Then, it is judged whether the magnitude of the three-beams signal TE is larger than a predetermined magnitude D or not (step 73). If step 73 results in Yes, it is recognized that the pickup 13 is in recorded region (step 74). Alternatively, if step 73 results in No, it is recognized that the pickup 13 is in unrecorded region (step 75). According to this operation, border of recorded and unrecorded area is discriminated by detecting transition position of the magnitude of the three-beams signal.

Border of recorded and unrecorded regions can be detected by other various methods. For example, border may be detected based on presence/absence of video signal or spindle error signal. Alternatively, information indicating last position of recorded region may be recorded within last vertical synchronizing period of recorded video signal. Further, address information may be recorded, in advance, in vertical synchronizing periods of video signal in a form of prepits. Further, information indicating end position of recorded region may be recorded in initial or last frame of recorded video signal. Alternative to information of end position of recorded region, other information such as title of contents of video signal may be recorded. Alternatively, a sensor may be provided to detect position of pickup in radial direction of disc and position of the pickup detected by the sensor may be stored in an external memory device or recorded in blank area of disc.

According to the methods described above, border of recorded and unrecorded region is accurately detected in an optical disc having non-wobbled pregrooves, and additional recording can be started from correct position. In addition, since it is unnecessary to record an end address in PMA, start position of additional recording can be quickly searched for.

[3] Determination of Optimum Recording Condition

Figure 8A:
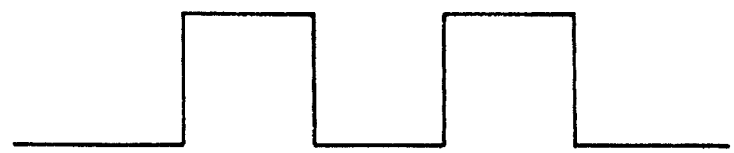
FIGS. 8A and 8B illustrate relationships between waveform of recording signal and information pits formed according to the recording signal.
Figure 8A:
Figure 8B:
Figure 8B:
Figure 9:
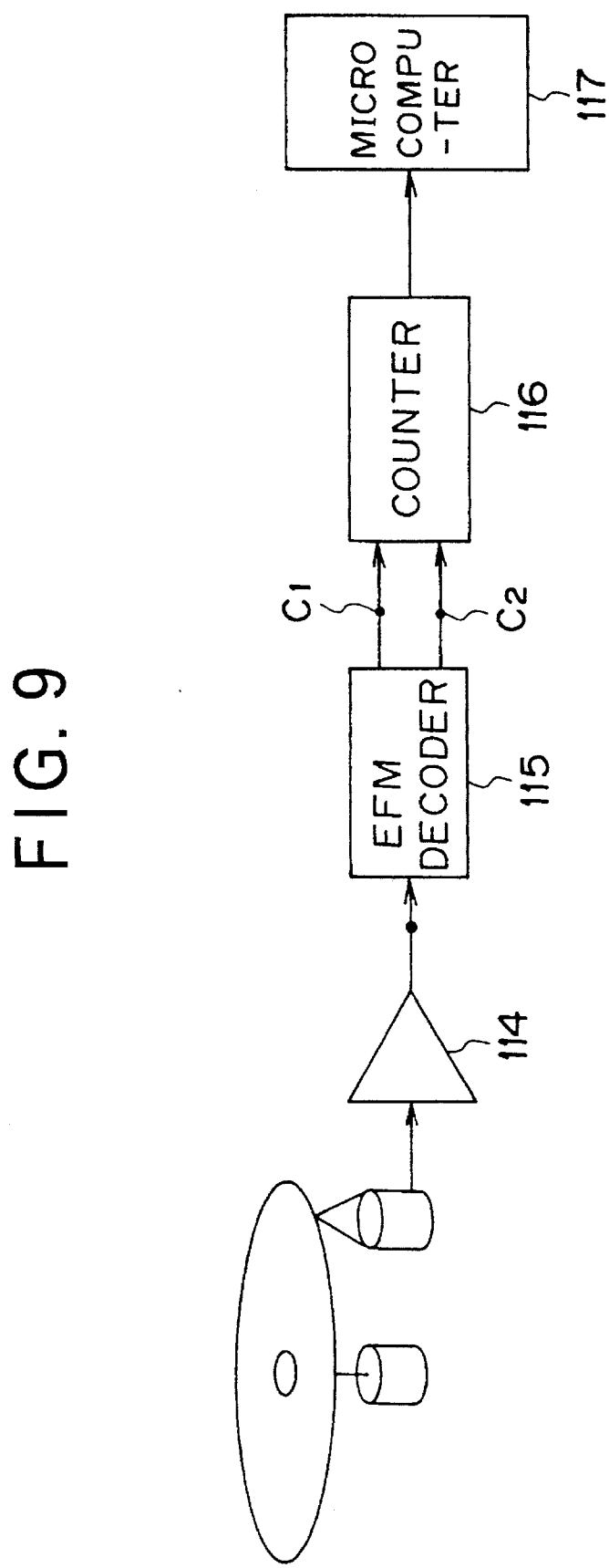
FIG. 9 illustrates manner of measuring error rate.

Next, determination of optimum recording condition will be described below. According to this invention, optimum recording condition is determined by examining multiple evaluation factors. Recording condition includes recording power and recording duty. Recording power is power of laser beam used for recording information (i.e., forming information pit) on an optical disc such as LD-R. Recording duty is duty ratio of recording signal used for driving laser of pickup. Recording duty will be described in more detail. FIGS. 8A and 8B illustrate relationships between waveform of recording signal and information pits formed according to the recording signal. FIG. 8A shows a case where recording duty D=50%, and FIG. 8B shows a case where recording duty D<50%. As seen from FIG. 8A, when recording duty D=50%, information pits are formed in shape like tear-drop due to accumulation of heat of laser beam. Therefore, in order to form information pits having substantially circular shape, recording duty D is required to be less than 50%, as shown in FIG. 8B. In this view, it is important to control recording duty D. Multiple evaluation factors include error rate, carrier level, number of dropouts in video signal, crosstalk quantity from neighboring tracks and jitter quantity. These factors will be described in more detail. Error rate is rate of errors in reproduced EFM signal. If signal is recorded under optimum recording condition, error rate becomes sufficiently small. FIG. 9 illustrates manner of measuring error rate. As illustrated, signal read from an optical disc by pickup is amplified by pre-amplifier 114, and EFM decoder 115 obtains EFM signal therefrom. The EFM decoder 115 supplies error outputs $C_1$ and $C_2$ indicating detection of error to counter 116 and the counter counts number of errors. Micro-computer 117 calculates error rate based on the number of errors supplied from the counter 116. Carrier level, which is another evaluation factor, is magnitude of RF signal recorded on an optical disc. If information is recorded under optimum recording condition, carrier level becomes sufficiently large. Yet another evaluation factor is number of dropouts included in video signal. If information is recorded under optimum recording condition, less dropouts occurs. Yet other evaluation factors are crosstalk quantity mixed from neighboring tracks and jitter quantity. If information is recorded under optimum recording condition, both crosstalk quantity and jitter quantity are sufficiently small. FIG. 10 illustrates a circuit for detecting these evaluation factors. As illustrated, an RF signal obtained by four-divided photodetector is supplied to dropout detector 105 via pre-amplifier 101 and FM corrector 102. The dropout detector 105 detects dropouts by examining magnitude level of RF signal, and counter 106 counts number of dropouts thus detected. Count result is supplied to the micro-computer 113. RF signal is also supplied to top-level detector 107 which detects top-level of the RF signal and bottom-level detector 108 which detects bottom-level of the RF signal. These signals are supplied to magnitude detector 110 which obtains magnitude of the RF signal. Magnitude of RF signal thus obtained is supplied to A/D converter 111, and digital signal indicating magnitude of RF signal (i.e., carrier level) is supplied to the micro-computer 113. RF signal is also supplied to crosstalk detector 109. In crosstalk detection, one of different signals (signal patterns) such as black level (having long pits) and white level (having short pits) are recorded every tracks alternately by test recording, and the crosstalk detector 109 detects crosstalk quantity based on level of signal reproduced. RF signal is also supplied to video demodulator 114 and demodulated video signal is supplied to jitter detector 115. The jitter detector 115 detects jitter quantity by comparing color burst portion of reproduced video signal with reference signal to detect phase fluctuation of reproduced video signal, i.e., jitter quantity. Jitter quantity thus detected is A/D converted and supplied to micro-computer 113. As described above, evaluation factors are measured and optimum recording condition is determined by examining these factors.

Figure 11:
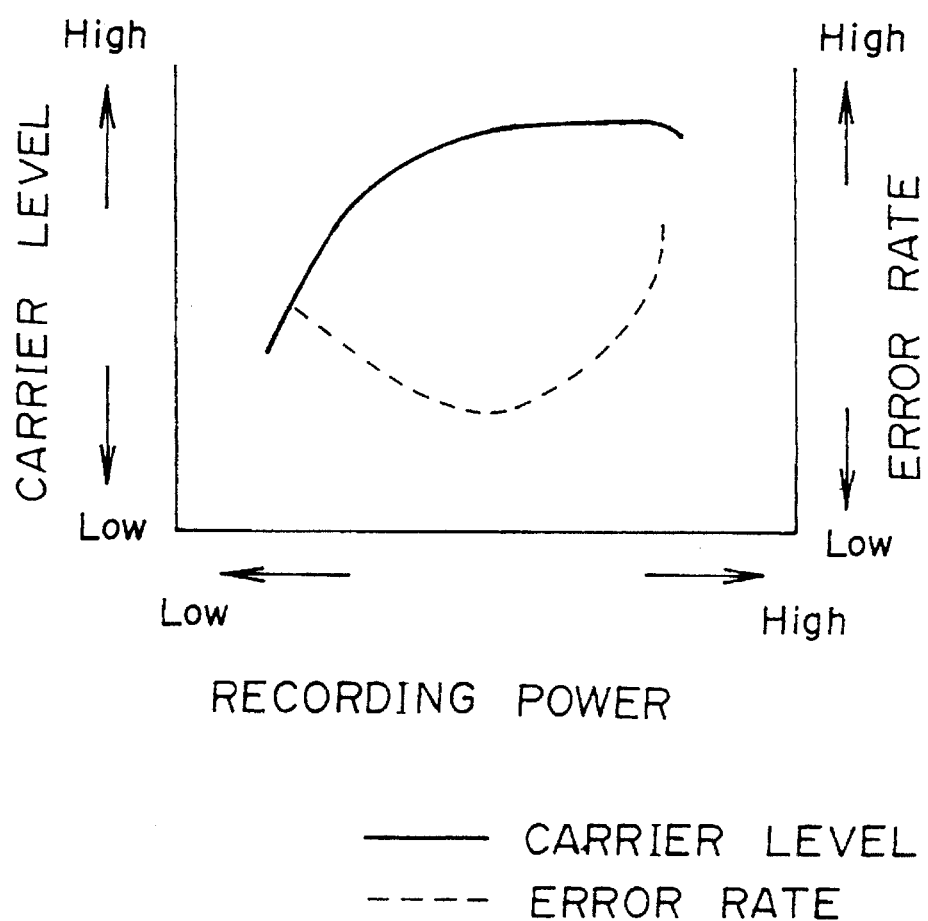
FIG. 11 illustrates variation of error rate and carrier level according to variation of recording power.
Figure 12:
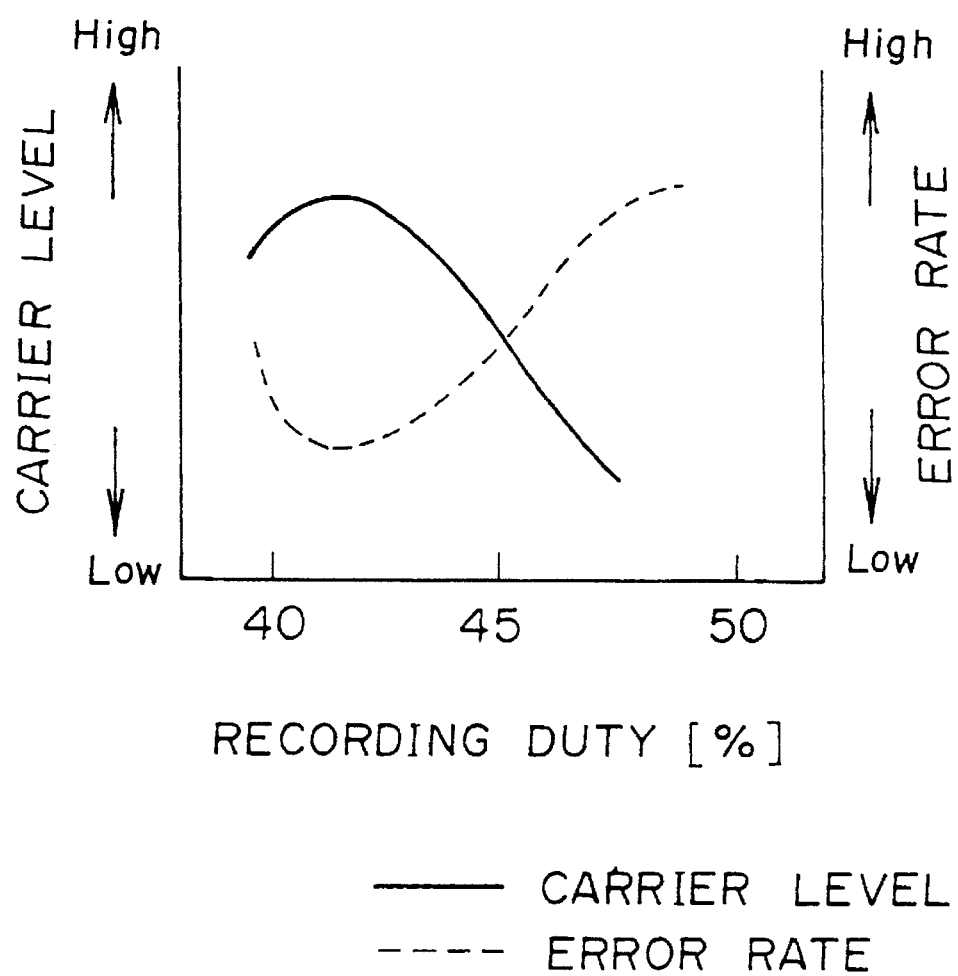
FIG. 12 illustrates variation of error rate and carrier level according to variation of recording duty.

FIG. 11 illustrates variation of error rate and carrier level according to variation of recording power, and FIG. 12 illustrates variation of error rate and carrier level according to variation of recording duty. Optimum recording condition (i.e., recording power and recording duty) is determined in consideration of the relationships shown in FIGS. 11 and 12. Specifically, optimum recording condition is so determined that carrier level is higher than a given reference level and error rate is lower than a given value. This condition is referred to as condition A in the following description. In addition, another condition B may be so decided that dropouts in reproduced video signal is less than a given value, that carrier level is higher than a given value, that crosstalk quantity from neighboring tracks is smaller than a given value, or that jitter quantity is smaller than a given value. These conditions may be used, as condition B, alone or in combination.

Figure 13:
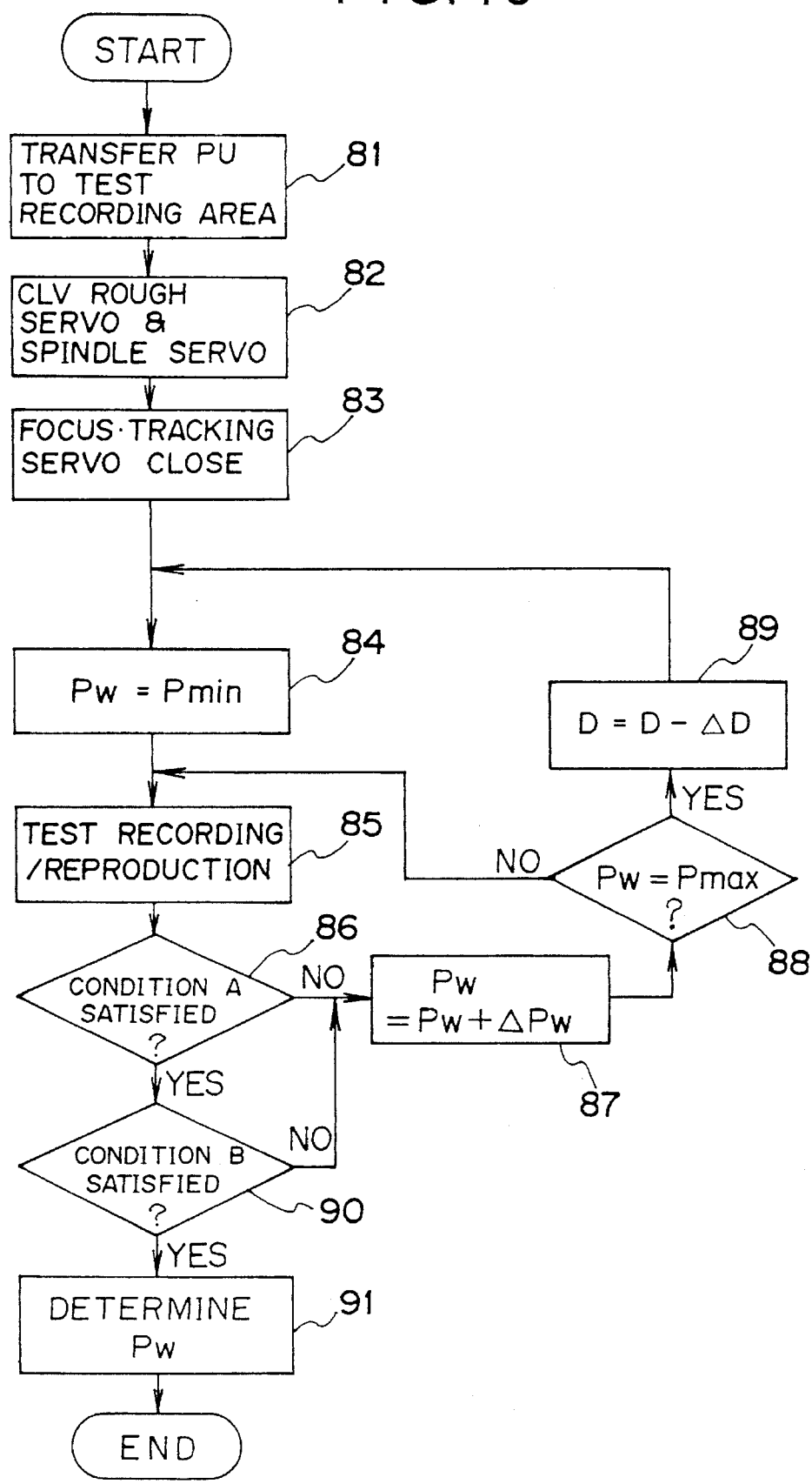
FIG. 13 is a flowchart illustrating operation of determining optimum recording condition.

Next, an operation of determining optimum recording condition will be described. FIG. 13 is a flowchart illustrating operation of determining optimum recording condition. Firstly, the pickup 13 is moved to area for test recording such as the reference area 2 shown in FIG. 2 (step 81), and CLV rough servo control is carried out so as to allow the spindle motor 12 to be in locked state (step 82). Then, focus servo loop and tracking servo loop are closed (step 83). Then, recording power $P_w$ is set to a minimum value $P_{min}$ (step 84) and test recording and reproduction are carried out within the area for test recording (step 85). In the test recording, FM video signal and EFM audio signal are recorded. Then, signals recorded by the test recording is read out, and it is judged whether condition A is satisfied or not by measuring and examining the evaluation factors described above (step 86). It is noted that the condition A is satisfied when carrier level of FM video signal is higher than a predetermined reference level and error rate of reproduced EFM signal is lower than a predetermined value. It is preferable that error rate of EFM reproduced signal is no more than $3 \times 10^{-2}$. If condition A is not satisfied (step 86:No), the recording power $P_w$ is increased by a minute value $\Delta P_w$ (step 87). The minute value $\Delta P_w$ may preferably be approximately 0.5 mV. Then, it is judged whether the recording power $P_w$ is equal to maximum value $P_{max}$ or not (step 88). If not, steps 85 and 86 are repeated. Alternatively, if the recording power $P_w$ is equal to the maximum value $P_{max}$ (step 88:Yes), recording duty D is decreased by a minute duty value $\Delta D$ (step 89), and steps 84–86 are repeated. Preferably, recording duty D is decreased by 2% (i.e., $\Delta D$ is 2% of duty D at that time) in step 89.

If condition A is satisfied (step 86:Yes), then it is judged whether condition B is also satisfied or not by measuring and examining the evaluation factors described above (step 90). If condition B is satisfied (step 90:Yes), the recording power $P_w$ at that time is determined as an optimum recording power (step 91). Alternatively, if condition B is not satisfied (step 90:No), then steps 87, 88, 89, 84, 85 and 86 are repeated.

Generally, when EFM signal and video signal are added to each other and then recorded, error rate of EFM signal and S/N ratio of video signal roughly have such a relationship that the lower error rate becomes, the higher S/N ratio increases. However, if error rate becomes minimum under a certain recording condition (recording power, recording duty), S/N ratio does not necessarily become maximum under the same condition. When S/N ratio is not maximum, it is preferable to give priority to condition under which S/N ratio becomes maximum, supposing that margin of block error rate is allowable. Namely, it is preferable that recording condition is decided by evaluating S/N ratio (e.g., carrier level) after considering margin of block error rate.

As described above, optimum recording power is determined based on not only error rate but also carrier level and other evaluation factors. Therefore, recording condition may be optimized and optimum recording power can be stably decided even if error rate is erroneously detected.

What is claimed is:

1. A method of calibrating power of laser beam emitted from a laser unit installed in a recording device and irradiated on an optical recording medium, comprising the steps of:

performing test recording of FM video signal and EFM audio signal with varying recording power of the laser beam and duty of recording signal for driving the laser unit independently of each other;

detecting carrier level of the recorded FM video signal and error rate of recorded EFM audio signal; and determining optimum recording power of the laser beam so that the carrier level is higher than a first predetermined value and the error rate is smaller than a second predetermined value.

2. A method according to claim 1, further comprising step of detecting number of dropouts in the recorded video signal, and said determining step determining optimum recording power so that the number of dropouts is smaller than a third predetermined value.

3. A method according to claim 1, further comprising step of detecting crosstalk quantity of the recorded video signal, and said determining step determining optimum recording power so that the crosstalk quantity is smaller than a fourth predetermined value.

4. A method according to claim 1, further comprising step of detecting jitter quantity of the recorded video signal, and said determining step determining optimum recording power so that the jitter quantity is smaller than a fifth predetermined value.

5. A laser power calibration device installed in a recording device for recording information on an optical recording medium, comprising:

laser unit for emitting and irradiating a laser beam on the optical recording medium to record FM video signal and EFM audio signal;

means for varying recording power of the laser beam and duty of recording signal for driving the laser unit independently of each other;

means for reading the FM video signal and EFM audio signal recorded on the optical recording medium;

means for detecting carries level of the recorded FM video signal and error rate of recorded EFM audio signal; and means for determining optimum recording power of the laser beam so that the carrier level is higher than a first predetermined value and the error rate is smaller than a second predetermined value.

6. A device according to claim 5, further comprising means for detecting number of dropouts in the recorded video signal, and said determining means determining optimum recording power so that the number of dropouts is smaller than a third predetermined value.

7. A device according to claim 5, further comprising means for detecting crosstalk quantity of the recorded video signal, and said determining means determining optimum recording power so that the crosstalk quantity is smaller than a fourth predetermined value.

8. A device according to claim 5, further comprising means for detecting jitter quantity of the recorded video signal, and said determining means determining optimum recording power so that the jitter quantity is smaller than a fifth predetermined value.

* * * * *